United States Patent Office

Re. 24,582
Reissued Dec. 23, 1958

24,582

METHOD AND ELECTROLYTE FOR PRODUCING BRIGHT GOLD

Edwin Cornell Rinker, Morristown, N. J., assignor to Sel-Rex Corporation, Belleville, N. J., a corporation of New Jersey No Drawing. Original No. 2,799,633, dated July 16, 1957, Serial No. 587,961, May 29, 1956. Application for reissue November 29, 1957, Serial No. 704,224

14 Claims. (Cl. 204—43)

Matter enclosed in heavy brackets [ ] appears in the original patent but forms no part of this reissue specification; matter printed in italics indicates the additions made by reissue.

This invention relates to the process of plating substantially pure gold on metallic or similar conductive surfaces by the electroplating process, to compositions for making electrolytic solutions for such process and to gold plated products made by such process.

This application is a continuation-in-part of my U. S. application Serial No. 346,261, filed April 1, 1953, now abandoned.

Among the objects of this invention is to provide a process and composition for electroplating gold on objects having metallic or similar conducting surfaces so as to produce a bright and relatively hard gold layer of any desired thickness and having the color of natural gold, on said objects.

Electrolytic gold platings as heretofore produced have generally been limited to extremely thin flash deposits of the order of 0.000001 to 0.0001 inch and have been applied to items of jewelry, razors and the like, after which a lacquer has been applied in order to provide resistance to abrasion. Such thin gold deposits offer little resistance to corrosion. When such deposits have been applied in thicknesses as great as about 0.000005 inch they begin to acquire a smoky, cloudy appearance. This latter effect takes place regardless of whether or not the basis metal is polished since even relatively thin deposits do not retain the finish of the basis metal.

The crystalline, non-lustrous, matte yellow deposits of relatively soft gold which have been produced heretofore have been buffed or scratch brushed to give them brighter surfaces but such refinishing operations are costly, wasteful and not entirely satisfactory.

Among other objects of this invention, therefore, is to provide articles with a plating of "bright gold" of relatively greater thickness, in excess of 0.000001 inch, for example, up to as high as 0.010 inch or more, which plating possesses a hard, mirror-like surface capable of producing a clear image reflection of objects facing its surface and in its reflecting capacity acting as if it had been highly polished without actually having been polished after removal from the electroplating solution.

This invention is based on the discovery that if a minute amount of potassium silver cyanide is added to a potassium gold cyanide electroplating solution containing free potassium cyanide, the said minute amount of potassium silver will affect the crystal structure of the deposited gold without adversely affecting the color or the karat of the gold deposit so that deposits of relatively high hardness and bright surfaces may be obtained regardless of the thickness of the gold plating layer.

Solutions containing potassium gold cyanide, potassium silver cyanide and/or free potassium cyanide have all been employed heretofore for plating gold or silver electrolytically. However, potassium gold cyanide and potassium silver cyanide have not been employed together in the same bath except in cases for the plating out of a gold alloy containing a substantial proportion of silver. In the process according to the present invention the plated metal consists of about 98% or more of pure gold.

The objects of the invention [are] *may be* accomplished by providing a salt mixture or electrolyte containing [as the essential ingredients,] the following components in the proportions set forth:

| Components | Minimum | | Normal | | Maximum | |
|---|---|---|---|---|---|---|
| | Prop. of Salt | Prop. as fine metal | Prop. of Salt | Prop. as fine metal | Prop. of Salt | Prop. as fine metal |
| $KAu(CN)_2$ g./l. | 6 | 4 | 12 | 8 | 48 | 32 |
| $KAg(CN)_2$ g./l. | 0.08 | 0.06 | 0.16 | 0.125 | 0.4 | 0.32 |
| Ratio, Au/Ag | | 100/1.5 | | 100/1.5 | | 100/1 |
| KCN g./l. | 45 | | 90 | | 200 | |

Based on the amount of gold and silver calculated as pure metal in the bath, the silver metal can vary from about 0.1% to about 2.0% by weight of said gold. If less than 0.1% by weight of silver is present in the bath the thickness at which bright deposits can still be obtained is limited. With over 2% by weight of silver (based on the amount of gold) there is a limit to the thickness at which bright deposits are still obtained and at this proportion of silver the color of the deposit already begins to be affected. It is well known, for example, that the color of gold deposits is readily affected by relatively small proportions of alloyed metals. For example, green gold deposits are obtained with small but significant proportions of alloyed silver and pinkish deposits are obtained with relatively small proportions of alloyed copper.

The plating bath of the invention may be operated at a current density of from 3–6 amperes per square foot of cathode surface which is within the normally employed plating density of 3–10 amperes per square foot of cathode surface. Better results are obtained with the bath of the invention when operated at around the higher current densities of about 6 amperes per square foot. The process operates with a cathode efficiency of 100%.

The bath of the invention is operated at a maximum temperature of about 80° F. A very satisfactory operating temperature is around 70° or normal room temperature. The lower limit of operating temperature is reached when one or more of the components begin to crystallize out of the bath, for example at about 45° F. The temperature requirements for plating with conventional gold plating baths is much higher. Thus, normal ambient temperatures are very satisfactory for the operation of the bath of the invention. Where stop-off tape, paint or other coatings are employed the low temperature of operation of the bath is very advantageous. Also, the low temperature avoids deterioration of the bath through decomposition of the cyanide content, etc., which occurs to an undesirable degree at higher temperatures.

In order to widen the bright plating range of the plating bath the alkali double cyanides of other metals such as nickel, cobalt, in amounts varying from 5 gr./liter to 30 gr./liter may be added without affecting the color of the deposit.

The addition of sodium thiosulfate besides the above mentioned double metal cyanides, in amounts ranging from 5 gr./liter to 35 gr./liter, has been found to increase the brilliance and lustre of the deposit.

Hardness tests made on a Tukon hardness tester on gold deposits produced in this bath indicated a hardness (converted to Vickers) of 115 as compared with a hardness of 65 on gold deposits produced in conventional hot plating solutions.

It will be noted that the free cyanide content of the bath is relatively high compared to the free cyanide content of conventional gold cyanide baths. Whereas conventional gold cyanide baths have a content of about 3 gr./liter to 10 gr./liter of free cyanide, the bath of the present invention has a content of from 10 gr./liter to *200* [100] gr./liter.

A satisfactory way of marketing the bath ingredients, is to combine all of the bath ingredients except the potassium gold cyanide. Since such a small amount of potassium silver cyanide is employed this provides a convenient way to assure the proper ratio of this ingredient. In that way the measuring and weighing of the minute amount of potassium silver cyanide by the user is eliminated. This composition may contain the hardener (potassium nickel cyanide, for example) and/or the brightener (sodium thiosulfate, for example) where either or both of such components are to be employed. To make up the electrolyte then all that is necessary is to add the correct proportions of the said mixture, the potassium gold cyanide and water.

It is understood that otherwise than is herein indicated the method of electroplating with any formula within the limits of the invention follows approved practice in maintaining a mild to rapid circulation of the electrolyte, the restoring of the indicated metal content as it becomes depleted during use, and other features of approved electrolytic deposition.

The following example serves to illustrate the method of operation of the invention and additional objects and advantages thereof.

EXAMPLE 1

880 parts by weight of potassium cyanide are thoroughly mixed with 1.5 parts by weight of potassium silver cyanide, 35 parts by weight of potassium nickel cyanide, and (optionally) 10 grams of sodium thiosulfate. These components are tumbled or otherwise mixed together for several hours until a thoroughly uniform mixture is obtained. When it is desired to gold plate an article approximately 88.5 grams of the above mixture and 11.5 grams of potassium gold cyanide are dissolved in one liter of water. Products plated by this bath have a "bright gold" color and finish, capable of producing a clear image reflection of objects facing their surface, and this finish is obtained with heavy deposits of up to 0.010" thickness as well as with thin deposits.

The brightness, hardness, non-porosity and extremely uniform coverage of this gold deposit makes it particularly desirable as a protective coating for industrial applications in modern communication and electronic apparatus.

I claim:

1. In the art of forming a layer in excess of .000005" thickness of bright gold containing about 0.1 to 2% of silver by electrolytic deposition, the method which consists in electrolyzing an electrolyte containing the following components in the following proportions dissolved in one liter of water:

| | Grams |
|---|---|
| Free potassium cyanide | 45 to 200 |
| Potassium gold cyanide | 6 to 48 |
| Potassium silver cyanide | 0.08 to 0.4 |

the proportion of potassium silver cyanide calculated as silver to potassium gold cyanide calculated as gold being between 0.1% and 2% by weight, and maintaining said bath at a temperature of between 45°F. and 80° F.

2. The process as claimed in claim 1 wherein the proportion of potassium silver cyanide calculated as silver to potassium gold cyanide calculated as gold is about 1.5:100.

3. The process as claimed in claim 1 comprising plating relatively thick layers of up to .010" and more of gold from said bath at a current density of 3–6 amperes per square foot.

4. A composition of matter for use as the electrolyte in an electrolytic cell to produce an electrodeposited layer of mirror bright gold containing about 0.1 to 2% of silver of a thickness of .000005" to about .010" consisting essentially of from 45–200 parts of free potassium cyanide, 6–48 parts of potassium gold cyanide and 0.08 to 0.4 parts of potassium silver cyanide, the proportion of potassium silver cyanide calculated as silver in the composition being between 0.1 to 2.0% of the proportion of potassium gold cyanide calculated as gold.

5. In a process of electrodepositing a layer in excess of .000005" thickness of bright gold containing about 0.1 to 2% of silver the steps comprising providing a composition containing a homogeneous mixture of 45 to 200 parts of free potassium cyanide, 0.08 to 0.4 parts of potassium silver cyanide, up to 15 parts of potassium nickel cyanide and up to 30 parts of sodium thiosulfate, mixing this composition with potassium gold cyanide in such proportions that the silver present in the mixture is 0.1 to 2.0% of the gold present therein and dissolving said composition in water in proportion to provide 6–48 grams per liter of potassium gold cyanide, thereafter electroplating a basis metal in said solution at temperatures of 45° F. to 80° F.

6. A composition of matter for use as an electrolyte in an electrolytic cell to produce an electrodeposited layer of mirror bright gold containing about 1.5% of silver of a thickness of .000005" to about .010", consisting of 45 to 200 parts of free potassium cyanide, 6 to 48 parts of potassium gold cyanide, 0.08 to 0.4 parts of potassium silver cyanide, up to 15 parts of a double metal cyanide selected from the group consisting of alkali metal nickel cyanide, alkali metal cobalt cyanide, and mixtures thereof, and up to 30 parts of an alkali metal thiocyanate, the proportion of potassium silver cyanide calculated as silver to potassium gold cyanide calculated as gold being about 1.5:100.

7. A composition of matter for use as an electrolyte in an electrolytic cell to produce an electrodeposited layer of mirror bright gold containing about 0.1 to 2% of silver of a thickness of .000005" to about .010", consisting of 45 to 200 parts of free potassium cyanide, 6 to 48 parts of potassium gold cyanide, .08 to 0.4 parts of potassium silver cyanide, up to 15 parts of a double metal cyanide selected from the group consisting of alkali metal nickel cyanide, alkali metal cobalt cyanide, and mixtures thereof, up to 30 parts of an alkali metal thiocyanate, the proportion of potassium silver cyanide calculated as silver being between 0.1 to 2% of the proportion of potassium gold cyanide calculated as gold.

*8. In the art of forming a layer in excess of .000005" thickness of bright gold containing about 0.1 to 2% of silver by electrolytic deposition, the method which consists in electrolyzing an electrolyte containing the following components in the following proportions dissolved in one liter of water:*

| | *Grams* |
|---|---|
| *Free potassium cyanide* | *10 to 200* |
| *Potassium gold cyanide* | *6 to 48* |
| *Potassium silver cyanide* | *0.08 to 0.4* |

*the proportion of potassium silver cyanide calculated as silver to potassium gold cyanide calculated as gold being*

*between 0.1% and 2% by weight, and maintaining said bath at a temperature of between 45° F. and 80° F.*

*9. The process as claimed in claim 8 wherein the proportion of potassium silver cyanide calculated as silver to potassium gold cyanide calculated as gold is about 1.5:100.*

*10. The process as claimed in claim 8 comprising plating relatively thick layers of up to .010" and more of gold from said bath at a current density of 3–6 amperes per square foot.*

*11. A composition of matter for use as the electrolyte in an electrolytic cell to produce an electrodeposited layer of mirror bright gold containing about 0.1 to 2% of silver of a thickness of .000005" to about .010" consisting essentially of from about 10 to 200 parts of free potassium cyanide, 6–48 parts of potassium gold cyanide and 0.08 to 0.4 part of potassium silver cyanide, the proportion of potassium silver cyanide calculated as silver in the composition being between 0.1 and 2.0% of the proportion of potassium gold cyanide calculated as gold.*

*12. In a process of electrodepositing a layer in excess of .000005" thickness of bright gold containing about 0.1 to 2% of silver the steps comprising providing a composition containing a homogeneous mixture of about 10 to 200 parts of free potassium cyanide, 0.08 to 0.4 part of potassium silver cyanide, up to 15 parts of potassium nickel cyanide and up to 30 parts of sodium thiosulfate, mixing this composition with potassium gold cyanide in such proportions that the silver present in the mixture is 0.1 to 2.0% of the gold present therein and dissolving said composition in water in proportion to provide 6–48 grams per liter of potassium gold cyanide, thereafter electroplating a basis metal in said solution at temperatures of 45° F. to 80° F.*

*13. A composition of matter for use as an electrolyte in an electrolytic cell to produce an electrodeposited layer of mirror bright gold containing about 1.5% of silver of a thickness of .000005" to about .010", consisting of about 10 to 200 parts of free potassium cyanide, 6 to 48 parts of potassium gold cyanide, 0.08 to 0.4 part of potassium silver cyanide, up to 15 parts of a double metal cyanide selected from the group consisting of alkali metal nickel cyanide, alkali metal cobalt cyanide, and mixtures thereof, and up to 30 parts of an alkali metal thiocyanate, the proportion of potassium silver cyanide calculated as silver to potassium gold cyanide calculated as gold being about 1.5:100.*

*14. A composition of matter for use as an electrolyte in an electrolytic cell to produce an electrodeposited layer of mirror bright gold containing about 0.1 to 2% of silver of a thickness of .000005" to about .010", consisting of about 10 to 200 parts of free potassium cyanide, 6 to 48 parts of potassium gold cyanide, 0.08 to 0.4 part of potassium silver cyanide, up to 15 parts of a double metal cyanide selected from the group consisting of alkali metal nickel cyanide, alkali metal cobalt cyanide, and mixtures thereof, up to 30 parts of an alkali metal thiocyanate, the proportion of potassium silver cyanide calculated as silver being between 0.1 and 2% of the proportion of potassium gold cyanide calculated as gold.*

References Cited in the file of this patent or the original patent

| | | |
|---|---|---|
| 1,104,842 | Smith | July 28, 1914 |
| 1,732,317 | Thoma | Oct. 22, 1929 |
| 2,110,792 | Egeberg et al. | Mar. 8, 1938 |

FOREIGN PATENTS

| | | |
|---|---|---|
| 2,029 | Great Britain | Aug. 15, 1864 |

OTHER REFERENCES

Young et al.: Metal Industry, April 1940, pp. 194–196.
Thews: Metal Finishing, September 1952, pp. 80–85.